United States Patent Office 2,724,700
Patented Nov. 22, 1955

2,724,700

SOLID COMPOSITIONS CONTAINING UREA AND POLYOXYETHYLENE ETHERS OF RESIN ALCOHOLS

George E. Barker, New Castle Hundred, Pleasant Hills, Del., assignor to Atlas Powder Company, Wilmington, Del., a corporation of Delaware No Drawing. Application July 3, 1951,
Serial No. 235,090

13 Claims. (Cl. 252—137)

This invention relates to solid compositions containing surface active polyoxyethylene ethers of alcohols derivable from resins and more particularly to solid compositions containing polyoxyethylene ethers of hydroabietyl alcohols.

It is an object of the invention to provide a solid composition containing a normally liquid to soft waxy polyoxyethylene ether of a resin alcohol.

Another object is to provide a solid detergent composition containing a normally liquid to soft waxy polyoxyethylene ether of a resin alcohol.

A further object is to provide a solid composition containing a normally liquid to soft waxy polyoxyethylene ether of a hydroabietyl alcohol.

The above and other objects will become more fully apparent from the following description and the appended claims.

Throughout this specification the term resin alcohol shall refer to alcohols derivable from such natural acidic resins as copal, wood rosin, gum rosin, and the like, by hydrogenation or by other means of reduction. Typical resin acids which yield the resin alcohols contemplated upon reduction are abietic acid, sapinic acid, and pimaric acid. The invention is described more specifically in terms of polyoxyethylene ethers of hydroabietyl alcohols which alcohols include dehydroabietyl alcohol, dihydroabietyl alcohol, tetrahydroabietyl alcohol, either singly or in admixture with each other, and the reduction product of natural wood rosin which is predominantly a mixture of the above named alcohols in the presence of minor proportions of non-acidic, non-alcoholic components of the rosin.

The polyoxyethylene ethers of resin alcohols constitute a useful class of surface active agents (cf. U. S. Patent 2,194,429 to Krzikalla et al.). They find application as non-ionic wetting agents, textile assistants, dispersing agents, and detergents. A number of the more useful ethers in this class range in consistency from liquids to soft waxy solids at ordinary temperatures. It is more convenient for some uses of such compounds to have them in solid form, for example, in molded bars, pellets, chips, or granular powder. The conventional method of solidifying fluid detergents is to absorb them into a solid powder or crystalline mass which in some cases may be formed at very high pressures into tablets or bars, but more often than not, such masses are utilized in granular or powdered form. The number of suitable absorbent materials is limited and their presence in the end product is often undesirable, especially in the large proportion necessary to dry up the liquid detergent.

In accordance with the present invention the surface active polyoxyethylene ethers of resin alcohols are solidified by admixture with urea. The reaction responsible for the solidification is not clearly understood but it is definitely different from the mere absorption of liquid by a solid. The behavior is more like the setting of cement or concrete in that a pasty mixture of finely powdered urea and liquid polyoxyethylene ether may remain apparently unchanged during an incubation period of varying length depending upon the particular ether, the particle size of the urea, and the proportion of ingredients, after which a more or less rapid solidification of the entire mass takes place. Other ingredients may be incorporated in the mixture to be solidified for the purpose of suitably modifying the final product. For example, detergent aids or builders, auxiliary emulsifying agents, or materials calculated to reduce the rate of solution of the solidified mixture in water may be added without inhibiting the concretion reaction and without departing from the spirit of the invention.

The surface active polyoxyethylene ethers of resin alcohols are readily prepared by direct addition of ethylene oxide thereto under pressure, at elevated temperatures, and in the presence of catalysts according to methods well understood in the art. This invention contemplates the use of such polyoxyethylene ethers in which there are an average of at least 4 oxyethylene groups per mol of resin alcohol, and the preferred ethers contain averages of from about 8 to about 20 oxyethylene groups per mol of resin alcohol. Typical useful polyoxyethylene ethers within the scope of the present invention are the polyoxyethylene ether of tetrahydroabietyl alcohol containing an average of 20 oxyethylene groups per mol of alcohol; the polyoxyethylene ether of dihydroabietyl alcohol containing an average of 8 oxyethylene groups per mol of dihydroabietyl alcohol; the polyoxyethylene ether of the commercial hydroabietyl alcohol sold by the Hercules Powder Company under the trademark "Abitol" containing 240 weight parts of oxyethylene radical per 100 parts of "Abitol," which corresponds to approximately 18 oxyethylene groups per hydroxyl group.

Solidified compositions comprising urea and the above described ethers may be prepared in a number of methods within the scope of the present invention. Generically, the several methods comprise the steps of preparing an intimate mixture of urea and the normally liquid to soft waxy polyoxyethylene ether of a resin alcohol, under conditions such that the said ether is in a fluid state, and allowing the mixture to set up to a solid form. Specifically, the methods vary in the means by which the intimate mixture is formed. Most simply, this may be accomplished by mixing finely divided solid urea with the polyoxyethylene ether at a temperature sufficiently high to render the latter ingredient fluid, but well below the melting point of urea; the resultant pasty mass is then formed into the desired shape, and held in a mold until concretion occurs. More rapid concretion may sometimes be obtained by passing the mixture of urea and polyoxyethylene ether through a soap mill to obtain very intimate mixing. The soft flakes scraped from the mill may be allowed to stand until the concretion reaction occurs and the set product utilized directly in the flake form, or may be compressed in molds to form cakes or bars before the concretion reaction is complete and allowed to set in that shape, or the flakes, after concretion may be ground to a powder.

A second method of preparing the compounds of the invention is to melt the urea and stir in the polyoxyethylene ether, preheated to approximately the melting point of urea, and allow the mixture to cool and undergo concretion. Because of the very intimate mixture obtained by mixing the ingredients in the molten condition, concretion between the crystallizing urea and the ether is very rapid, frequently being complete by the time the composition has cooled to room temperature. In operating by this method the molten mixture may be poured in molds to form bars or cakes, or the molten mixture may be sheeted on chilled surfaces to form flakes, or may be allowed to set into hardened massive pieces for later grinding or chipping to form flakes, granules or powder as desired. Heating the mixture to temperatures much above the melting point of urea should be avoided to minimize thermal decomposition thereof.

A third method of producing concreted compositions of urea and polyoxyethylene ethers of resin alcohols is to prepare an aqueous mixture of the components, containing up to 50% water, subject the mixture to spray drying treatment according to techniques well known in the art, and allow the concretion process to occur in the granules so formed. The very intimate contact between the growing crystals of urea and the said ether which is established in the spray droplets as the water evaporates is conducive to rapid concretion. This third described method is especially useful for preparing the compositions of the invention in granular form.

The proportion of urea to surface active polyoxyethylene ether in the compositions of this invention may be varied between wide limits. When there is no other component in the mixture, it is generally preferred to use at least 30 parts of urea to 70 parts of the polyoxyethylene ether of resin alcohol. Hard, dry products are obtained at all higher ratios although it is preferred not to exceed the proportion of 90 parts urea to 10 parts of the said polyoxyethylene ether.

In the presence of solid additives such as alkaline detergent builders, sodium sulfate, clay, and the like, it may be possible to use smaller proportions of urea to polyoxyethylene ether than is indicated above. A common disadvantage of granular detergent compositions comprising liquid surface active agents absorbed in alkaline detergent builders is that, on storage, the liquid tends to "bleed" from the mixture, especially if it is in contact with an absorptive substance such as chip board or cardboard containers. A real problem in economical packaging is thus raised. The present invention offers a convenient solution to this problem. By employing as the liquid surface active agent a polyoxyethylene ether of resin alcohol within the range of compositions cited hereinbefore, and by including in the built detergent composition a suitable proportion of urea, the concretion reaction between the two serves to bind the excess liquid detergent and prevent bleeding thereof from the mixture. An especially useful embodiment of the invention, therefore, comprises a granular, alkaline built, detergent containing as its surface active agent the solid concretion products disclosed herein. In such compositions it is preferred to employ at least 50% of the said alkaline detergent builder and sufficient of the said concretion product to provide at least 3% of the polyoxyethylene ether in the form of its concretion product.

Any of the well known alkaline detergent builders can be employed to so prepare non-bleeding built detergents in which the surface active agent is a liquid. Among such may be named trisodium phosphate, tetrasodium pyrophosphate and other polyphosphates, sodium carbonate, sodium sesquicarbonate, sodium metasilicate, borax and its variously dehydrated derivatives, and the like. The compositions may be prepared by any suitable means, such, for example, as by mixing the alkaline builder and urea, then adding the polyoxyethylene ether and thoroughly incorporating it, and allowing the mixture to stand until all free liquid has set to a solid with the urea, or by preforming the solidified urea-polyoxyethylene ether product by any of the methods described hereinbefore, converting it to granular form and mixing it with the granular alkaline builder.

The following nonlimiting examples of compositions made according to this invention are illustrative of its practice.

*Example I*

50 grams of finely divided solid urea was intimately mixed at a temperature of 40 to 50° C., with 50 grams of the polyoxyethylene ether obtained by adding 240 parts of ethylene oxide to 100 parts of the commercial hydroabietyl alcohol under the tradename "Abitol," which contains dehydroabietyl alcohol, dihydroabietyl alcohol and tetrahydroabietyl alcohol, together with approximately 15% of nonalcoholic material. The mixture was formed into a compact mass and allowed to stand at room temperature. After 24 hours the mixture had set to a hard mass which could be ground to a dry powder.

*Example II*

50 grams of finely divided solid urea was intimately mixed at a temperature of 40 to 50° C., with 50 grams of the polyoxyethylene ether obtained by adding 60 parts of ethylene oxide to 100 parts of the commercial hydroabietyl alcohol described in Example I. The mixture was formed into a compact mass and allowed to stand at room temperature. After 24 hours the mixture had set to a hard mass which could be flaked.

*Example III*

To prepare a composition according to the second method of the invention, 80 grams of urea is melted by heating on an oil bath (165° C.). Twenty grams of the polyoxyethylene ether obtained by adding 300 parts of ethylene oxide to 100 parts of the commercial hydroabietyl alcohol described in Example I is added to the molten urea, the mixture is thoroughly stirred and poured into a mold. Upon cooling the melt hardens to a solid which can be ground to a dry powder.

*Example IV*

To prepare a composition of this invention in a spray tower a mixture of 65 parts of urea and 5 parts of water is heated to 115° C.–120° C. 35 parts of polyoxyethylene hydroabietyl alcohol containing an average of 20 oxyethylene groups per molecule is added, maintaining the temperature at 115° C.–120° C. The mixture is atomized by means of a spray nozzle into the top of a tower about 30 feet high with an incoming counter-current flow of cold air. The product collected at the bottom of the tower is moved to storage until set.

*Example V*

A second set of conditions for operating a spray tower for preparing compositions of this invention follow: A mixture of 65 parts of urea and 25 parts of water is heated to 100° C. 35 parts of polyoxyethylene hydroabietyl alcohol containing an average of 20 oxyethylene groups per molecule is added, maintaining the temperature at 100° C. The mixture is atomized by means of a spray nozzle with the top of a tower about 30 feet high with an incoming co-current flow of hot air (350–400° F.), which leaves the tower at 100–150° F. The product collected at the bottom of the tower is moved to storage until set.

*Example VI*

To prepare a composition containing a detergent builder by the method of this invention, 30 grams of solid urea and 100 grams of tetrasodium pyrophosphate are first mixed together; then at a temperature of 40° to 50° C., 70 grams of the polyoxyethylene ether described in Example III is added and the whole thoroughly mixed to yield a thick slurry which is allowed to stand at room temperature. Within 48 hours the slurry sets to a hard mass which can be flaked or powdered.

The tetrasodium pyrophosphate of the foregoing example may be replaced by trisodium phosphate, sodium tetraborate pentahydrate, sodium sesquicarbonate, or the like, to yield granular alkaline built detergents of varying alkalinity.

*Example VII*

Equal parts by weight of granular sodium metasilicate and the granular product of Example IV are thoroughly commingled in a ribbon mixer to yield an all-purpose granular alkaline built detergent.

In the foregoing description and illustrative examples a wide range of compositions is covered. The preferred surface active agents within this broad scope are those polyoxyethylene ethers of the mixed hydroabietyl alcohols derived from wood rosin which contain from 8 to 20 oxyethylene groups per hydroxyl group of the alcohol. Moreover, it is preferred, when solidifying the preferred normally liquid to soft waxy polyoxyethylene ethers of hydroabietyl alcohol in the absence of other ingredients such as detergent builders and the like, to employ from about 30 to about 70 parts of urea with from about 70 to about 30 parts of the said polyoxyethylene ether.

This application is a continuation-in-part of my application Serial No. 72,766 filed January 25, 1949, now abandoned.

What is claimed is:

1. A composition consisting essentially of the solid concretion product of urea and a normally liquid to soft waxy polyoxyethylene ether of a resin alcohol containing an average of at least 4 oxyethylene groups per mol of said alcohol; the said concretion product containing at least 10% of the said polyoxyethylene ether.

2. A composition consisting essentially of the solid concretion product of urea and a normally liquid to soft waxy polyoxyethylene ether of a hydroabietyl alcohol containing an average of from about 8 to about 20 oxyethylene groups per mol of alcohol; the said concretion product containing at least 10% of the said polyoxyethylene ether.

3. A composition consisting essentially of the solid concretion product of urea and a normally liquid to soft waxy polyoxyethylene ether of a resin alcohol containing an average of at least 4 oxyethylene groups per mol of said alcohol, wherein the ratio of urea to said ether lies between the inclusive limits of 30/70 and 90/10.

4. A composition as in claim 3 wherein the said ether is a polyoxyethylene ether of a hydroabietyl alcohol containing an average of from about 8 to about 20 oxyethylene groups per mol of alcohol.

5. A granular, alkaline built, detergent composition comprising at least 50% of an alkaline detergent builder selected from the group consisting of phosphates, silicates, borates and carbonates of sodium and sufficient of the product of claim 1 to provide at least 3%, based on the total composition, of the said polyoxyethylene ether in the form of its concretion product with urea.

6. The method which comprises intimately admixing urea and a normally liquid to soft waxy polyoxyethylene ether of a resin alcohol in which the number of oxyethylene groups per mol is at least 4, the said polyoxyethylene ether being in a liquid state; the quantity of urea so admixed being sufficient to combine with said ether to form a concreted mixture; and allowing the mixture to set up to a solid form.

7. The method defined in claim 6 wherein the ratio of the said urea to said polyoxyethylene ether lies between the inclusive limits of 30/70 and 90/10.

8. The method which comprises intimately admixing finely divided solid urea and a normally liquid to soft waxy polyoxyethylene ether of a resin alcohol in which the number of oxyethylene groups per mol is at least 4, the said polyoxyethylene ether being in a liquid state; the quantity of urea so admixed being sufficient to combine with said ether to form a concreted mixture; and allowing the mixture to set up to a solid form.

9. The method defined in claim 8 wherein the ratio of said urea to said polyoxyethylene ether lies between the inclusive limits of 30/70 and 90/10.

10. The method which comprises intimately admixing molten urea and a normally liquid to soft waxy polyoxyethylene ether of a resin alcohol in which the number of oxyethylene groups is at least 4, the quantity of urea so admixed being sufficient to combine with said ether to form a concreted mixture; allowing the mixture to cool, and to set up to solid form.

11. The method defined in claim 10 wherein the ratio of the said urea to the said polyoxyethylene ether lies between the inclusive limits of 30/70 and 90/10.

12. The method which comprises admixing urea and a normally liquid to soft waxy polyoxyethylene ether of a resin alcohol in which the number of oxyethylene groups is at least 4, with water to form a sprayable mixture, the quantity of urea so admixed being sufficient to combine with the said polyoxyethylene ether to form a solid concretion product; spray drying the mixture; and allowing the granules so produced to set up to solid form.

13. The method defined in claim 12 wherein the ratio of the said urea to the said polyoxyethylene ether lies between the inclusive limits of 30/70 and 90/10.

References Cited in the file of this patent

UNITED STATES PATENTS

| | | |
|---|---|---|
| 2,063,987 | Dreyfus | Dec. 15, 1936 |
| 2,194,429 | Krzikalla et al. | Mar. 19, 1940 |
| 2,251,768 | Swain | Aug. 5, 1941 |
| 2,374,187 | Flett | Aug. 24, 1945 |
| 2,383,738 | Richardson et al. | Aug. 28, 1945 |
| 2,383,740 | Tucker | Aug. 28, 1945 |
| 2,514,954 | Johnson et al. | July 11, 1950 |
| 2,576,913 | Baird et al. | Dec. 4, 1951 |

FOREIGN PATENTS

| | | |
|---|---|---|
| 443,795 | Great Britain | Mar. 6, 1936 |
| 807,280 | France | Oct. 12, 1936 |
| 467,571 | Great Britain | June 16, 1937 |